United States Patent
Brune et al.

(10) Patent No.: US 10,158,734 B2
(45) Date of Patent: Dec. 18, 2018

(54) TRIGGER ASSOCIATED NOTIFICATION DELIVERY IN AN ENTERPRISE SYSTEM

(71) Applicant: Google LLC, Mountain View, CA (US)

(72) Inventors: Kevin D. Brune, Davis, CA (US);
Nicole Gibson, Santa Clara, CA (US);
Duane Valz, San Francisco, CA (US);
Yevgeniy Eugene Shteyn, Cupertino, CA (US)

(73) Assignee: Google LLC, Mountain View, CA (US)

( * ) Notice: Subject to any disclaimer, the term of this patent is extended or adjusted under 35 U.S.C. 154(b) by 160 days.

(21) Appl. No.: 14/798,913

(22) Filed: Jul. 14, 2015

(65) Prior Publication Data
US 2016/0294964 A1    Oct. 6, 2016

Related U.S. Application Data

(60) Provisional application No. 62/141,565, filed on Apr. 1, 2015.

(51) Int. Cl.
*G06F 15/16* (2006.01)
*H04L 29/08* (2006.01)
(Continued)

(52) U.S. Cl.
CPC ........... *H04L 67/26* (2013.01); *G06N 99/005* (2013.01); *G06Q 10/109* (2013.01)

(58) Field of Classification Search
CPC .... G06N 99/005; G06Q 10/109; G06Q 10/10; G06F 17/30634; G10L 2015/223; G10L 15/22
(Continued)

(56) References Cited

U.S. PATENT DOCUMENTS 6,678,698 B2 * 1/2004 Fredell .................. G06Q 10/06
   707/608
7,487,456 B2 * 2/2009 Brooke ................ G06Q 10/109
   715/748
(Continued)

OTHER PUBLICATIONS

"Pro-active meeting assistants: attention please!" by Rutger Rienks, Anton Nijholt, Paulo Barthelmes, AI & Soc (2009): 23: 215-217.*
(Continued)

*Primary Examiner* — Dhairya A Patel
(74) *Attorney, Agent, or Firm* — Fish & Richardson P.C.

(57) ABSTRACT

Methods, systems, and apparatus, including computer programs encoded on a computer storage medium, for presenting notifications in an enterprise system. In one aspect, a method include actions of obtaining a template that defines (i) trigger criteria for presenting a notification type and (ii) content rules for determining content to include in a notification of the notification type. Additional actions include accessing enterprise resources of an enterprise, the enterprise resources including data describing entities related to the enterprise and relationships among the entities. Further actions include, accessing user information specific to a user and determining that the trigger criteria is satisfied by the enterprise resources and the user information. Additional actions include generating a particular notification of the notification type based at least on the content rules and providing the particular notification to the user.

20 Claims, 7 Drawing Sheets

(51) Int. Cl.
*G06N 99/00* (2010.01)
*G06Q 10/10* (2012.01)

(58) Field of Classification Search
USPC ...................................... 709/204; 707/999.03
See application file for complete search history.

(56) References Cited

U.S. PATENT DOCUMENTS

| | | | |
|---|---|---|---|
| 8,412,529 B2 | 4/2013 | McKee et al. | |
| 8,700,665 B2 | 4/2014 | Beauregard et al. | |
| 8,798,995 B1 | 8/2014 | Edara | |
| 2004/0215610 A1* | 10/2004 | Dixon ..................... | G06Q 10/10 |
| 2006/0167847 A1* | 7/2006 | Bangel ............. | G06Q 10/06314 |
| 2008/0243807 A1* | 10/2008 | Gaucas ................. | G06F 17/248 |
| 2008/0274755 A1* | 11/2008 | Cholkar ................. | H04W 8/18 |
| | | | 455/461 |
| 2010/0057799 A1* | 3/2010 | Fuselier ................. | G06Q 10/06 |
| | | | 707/725 |
| 2013/0054613 A1* | 2/2013 | Bishop .............. | G06F 17/30011 |
| | | | 707/748 |
| 2013/0132445 A1* | 5/2013 | Koppenhagen ........ | G06Q 10/06 |
| | | | 707/810 |
| 2014/0032683 A1* | 1/2014 | Maheshwari ......... | H04L 51/063 |
| | | | 709/206 |
| 2014/0052681 A1* | 2/2014 | Nitz ........................ | H04L 51/02 |
| | | | 706/46 |
| 2014/0129331 A1* | 5/2014 | Spivack ............. | G06Q 30/0269 |
| | | | 705/14.53 |
| 2014/0257812 A1 | 9/2014 | Mozer | |
| 2014/0273979 A1 | 9/2014 | Van Os et al. | |
| 2014/0282003 A1 | 9/2014 | Gruber et al. | |
| 2014/0354538 A1 | 12/2014 | Kihuk et al. | |
| 2015/0067047 A1* | 3/2015 | Fu .......................... | H04L 67/16 |
| | | | 709/204 |
| 2015/0149370 A1* | 5/2015 | Klein ................ | G06F 17/30011 |
| | | | 705/311 |
| 2015/0186635 A1* | 7/2015 | Nakhjiri ................ | G06F 21/604 |
| | | | 726/17 |
| 2016/0321583 A1* | 11/2016 | Jones ..................... | G06Q 10/10 |

OTHER PUBLICATIONS

Wikipedia [online] "Business intelligence tools," May 15, 2015 [retrieved May 28, 2015]. Retrieved from the Internet: URL<http://en.wikipedia.org/wiki/Business_intelligence_tools>, 4 pages.
Besselmann-Hamandouche et al., "Getting Started with IBM WebSphere Cast Iron Cloud Integration," Jan. 11, 2012, Vervante, 342 pages XP055271254.
International Search Report and Written Opinion in International Application No. PCT/US2016/024752, dated May 19, 2016, 12 pages.
Wikipedia: "Intelligent personal assistant," Internet Article, Mar. 22, 2015, XP055271342, Retrieved from the Internet: URL: https://en.wikipedia.org/w/index.php?title=Intelligent_personal_assistant&oldid=652979898, [retrieved on May 10, 2016], 3 pages.
Windley, "The Live Web: Building Event-Based Connections in the Cloud", Dec. 21, 2011, Course Technology PTR, XP055258627, 61 pages.
'en.wikipedia.org' [online] "Mobile Web," Mar. 27, 2015, [retrieved on Feb. 24, 2016] Retrieved from Internet: URL<https://en.wikipedia.org/w/index.php?title=Mobile_Web&oldid=653815098> 7 pages.
'en.wikipedia.org' [online] "Siri," Mar. 31, 2015, [retrieved on Aug. 28, 2018] Retrieved from Internet: URL<https://en.wikipedia.org/w/index.php?title=Siri&oldID=654305746> 11 pages.
'www.channel4.com' [online] "Secret life of phones: how yours contact 315 servers a day," Geoff White, Nov. 14, 2013, [retrieved on Aug. 28, 2018] Retrieved from Internet: URL<https://www.channel4.com/news/phone-mobile-data-24-hours-apps-security-secret> 7 pages.
'www.heise.dr' [online] "Wo bist'n du? -Googles Geodienst Latitude," Jan. 17, 2011, [retrieved on Jul. 30, 2015] Retrieved from Internet: URL<https://www.heise.de/artikel-archiv/ct/2011/03/086@00250@/ct.11.03.086-088.pdf> 3 pages (German language document).
'www.sueddeutsche.de' [online] "So Futioniert Siri," Oct. 9, 2011, [retrieved on Oct. 3, 2018] Retrieved from Internet: URL<http://www.sueddeutsche.de/digital/sprachsteuerung-am-computer-so-funktionert-siri-1.1157482> 5 pages (Machine Translation).
Bell et al. "Machine Learning Hands-On for Developers and Technical Professionals," Nov. 3, 2014, Wiley, Table of Contents, 1-27, Chapter 9, Index, 82 pages.
Coulouris et al. "Distributed Systems: Concepts and Design (5$^{th}$ Edition)" May 7, 2011, Addison-Wesley, US, Table of Contents, Preface, Chapters 1, 4, 6, 19, References and Index.
Dyszel. "Outlook 2013 for Dummies," Mar. 4, 2013, ISBN 978-1-118-49046-4, 387 pages.
EP Office Action issued in European Application No. 16716118.1, dated Sep. 5, 2018, 12 pages.
Labrador et al. "Location-Based information Systems: Developing Real-Time Tracking Applications," Oct. 21, 2010, Chapman and Hall, Table of Contents, Chapters 1 and 2, 34 pages.
Mcilwraith et al. "Algorithms of the intelligent web, 2$^{nd}$ edition—MEAP Version 1," Jan. 31, 2015, Manning Publications, Chapter 1, 23 pages.
Rodrigues et al. "Mobile Networks and Cloud Computing Convergence for Progressive Services and Applications," Nov. 30, 2013, 12 pages.

* cited by examiner

TRIGGER ASSOCIATED NOTIFICATION DELIVERY IN AN ENTERPRISE SYSTEM

CROSS-REFERENCE TO RELATED APPLICATIONS

This application claims priority to U.S. Patent Application No. 62/141,565, entitled "TRIGGER ASSOCIATED NOTIFICATION DELIVERY IN AN ENTERPRISE SYSTEM," filed Apr. 1, 2015, which is incorporated herein by reference in its entirety.

TECHNICAL FIELD

This disclosure generally relates to enterprise systems, and one particular implementation relates to providing notifications for enterprise systems.

BACKGROUND

An enterprise system may store various data for users of an enterprise system. For example, an enterprise system may store information indicating team members of users, projects users are working on, and users' availability. The enterprise system may enable users to access information stored in the enterprise system. For example, a user may view availability of other users or projects other users are working on. However, users of the enterprise may be unaware of information stored by the enterprise system that may be useful to the user. For example, a user that wants to meet with another user may be unaware that the other user has recently become available when the user is available.

SUMMARY

In general, an aspect of the subject matter described in this specification may involve a process for presenting notifications in an enterprise system. An enterprise system may have access to various types of information. For example, the enterprise system may have access to user information that is specific to a user, e.g., e-mails or internet browser history information of a user, enterprise resources, e.g., documents and information accessible to users of the enterprise, and external sources, e.g., public resources on the internet. The enterprise system may use the information accessible to the enterprise system to present notifications to the user. For example, the enterprise system may present a notification to a user that the other attendees of a meeting will be late, the user should wear a suit and tie to the upcoming meeting, the user may want to use particular documents during the meeting, or that the user can arrange a follow-up meeting with another user that the user mentioned during the meeting.

The enterprise system may present notifications based on extraction templates. The templates may define trigger criteria for presenting notifications and define content rules for determining content to include in the notifications. For example, a template may define to present a notification to a user that documents are available for viewing if the user says a particular phrase during a meeting, and define that the notification should identify the particular documents that are available.

The enterprise system may generate notifications based on the extraction templates and the information obtained from one or more of the user information, enterprise resources, and the external sources. For example, the enterprise system may obtain an extraction template for presenting a notification to the user that documents are available, determine that the user has said "NEXT TOPIC IS PROJECT X" and that the user information includes documents associated with project X, and in response, determine to generate a notification of the availability of the documents associated with project X and present the notification to the user.

In some aspects, the subject matter described in this specification may be embodied in methods that may include the actions of obtaining a template that defines (i) trigger criteria for presenting a notification type and (ii) content rules for determining content to include in a notification of the notification type. Additional actions include accessing enterprise resources of an enterprise, the enterprise resources including data describing entities related to the enterprise and relationships among the entities. Further actions include, accessing user information specific to a user and determining that the trigger criteria is satisfied by the enterprise resources and the user information. Additional actions include generating a particular notification of the notification type based at least on the content rules and providing the particular notification to the user.

Other versions include corresponding systems, apparatus, and computer programs, configured to perform the actions of the methods, encoded on computer storage devices.

These and other versions may each optionally include one or more of the following features. For instance, in some implementations the trigger criteria includes detecting a change in data describing an entity that is indicated by the relationships among the entities as being related to the user. In certain aspects, the trigger criteria includes detecting a particular spoken phrase.

In some aspects, the content rules includes rules that include extracting text from the enterprise resources and including the text in the particular notification.

In some implementations, actions include generating the template using a machine-learning based template generator. In certain aspects, actions include sharing the template with multiple users.

In certain aspects, generating a particular notification based at least on the content rules includes removing content from the particular notification that the user is not permitted to access.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1A:
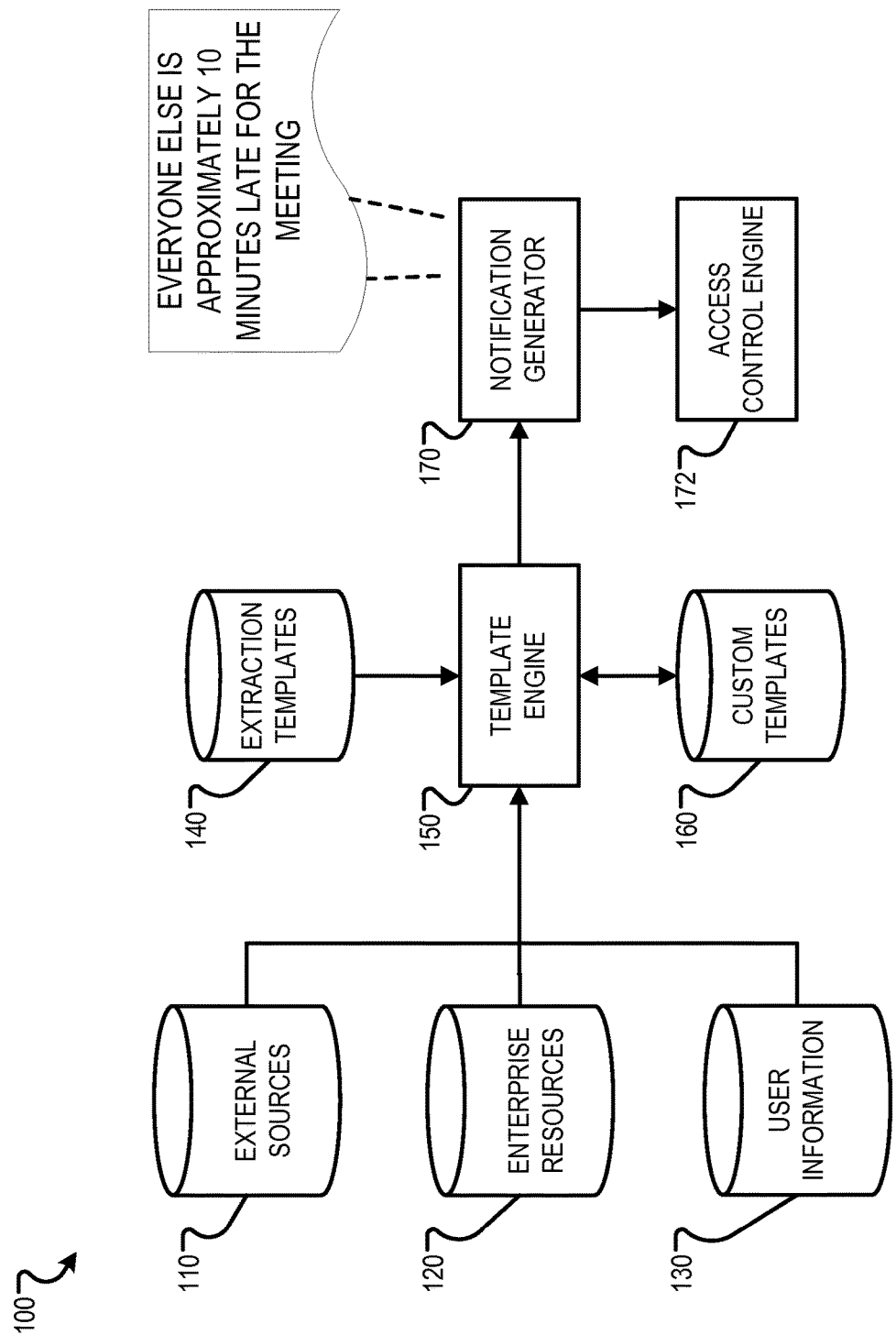
FIGS. 1A-D are illustrations of block diagrams of example systems for presenting notifications in an enterprise system.

FIG. 1A is a block diagram of an example system 100 for presenting notifications in an enterprise system. Briefly, and as described in further detail below, the system 100 may include external sources 110, an enterprise resource database 120, a user information database 130, an extraction template database 140, a template engine 150, a custom template database 160, a notification generator 170, and an access control engine 172.

The external sources 110 may include sources of information that are not provided by an enterprise system. For example, the external sources 110 may include internet resources, e.g., websites, videos, documents, files, or other resources that are publicly available on the internet. In another example, the external sources 110 may include information sources with limited public availability. For example, the external sources 110 may include subscription-based information sources.

The enterprise resource database 120 may include a data store that stores resources that are available to users of an enterprise system. For example, the resources may include documents, files, meeting information, shared network drives, user calendar availability, user location information, and other information that are accessible by two or more users of the enterprise system. In particular, the enterprise resources may include data describing entities related to the enterprise and relationships among the entities. For example, the entities may be other users, the data describing relationships may be team member information or meeting attendee information, and the data describing the entities may be location information of the other users.

In some implementations, users may be able to choose whether information will be stored in the enterprise resource database 120, and which users may access a resource. For example, the enterprise resource database 120 may include metadata associated with each resource that indicates which users may access the resource.

The user information database 130 may include a data store that stores user information that is specific to a user. User information that is specific to a user may include information not described by enterprise resources. For example, the user information may include e-mails of the user, a search history of the user, a calendar of the user, a user's network drive, and other information of a user that is not accessible by other users. In cases in which a user has chosen not to store particular information in the enterprise resource database 120, the particular information may be stored in the user information database 130. For example, if a user chooses not to share location information of the user, the user's location information may be stored in the user information database 130 instead of in the enterprise resource database 120. In another example, where a user has opted not to share a calendar of the user, the calendar may be stored in the user information database 130 instead of the enterprise resource database 120.

The extraction template database 140 may be a data store that stores extraction templates. The extraction templates may be templates that define trigger criteria for presenting notifications and define content rules for determining content to include in the notifications. For example, an extraction template may define to present a notification to a user if attendees of a meeting are expected to be late, and define content of the notification to indicate the attendees that are expected to be late and an estimated time of attendance for the attendees. Additional examples of extraction templates are described in FIGS. 1B-1D.

The content rules may specify that notifications are one or more of visual or audio notifications. For example, the content rules may specify a visual notification that appears in a pop-up window on a display of a device of a user. In another example, the content rules may specify an audio notification that is output as audio when a device of a user is in a non-silent mode of operation. In yet another example, the content rules may specify an audio notification if a device of a user is in a non-silent mode of operation, and otherwise a visual notification. In other examples, the content rules may specify that the notifications should appear as tickers, as standalone widgets, or as other user interface elements.

In some implementations, the content rules may specify content to include in notifications is to be presented in a consistent, structured format. For example, the content rules for a location related extraction template may specify that a top of a visual notification include a map and a bottom of the visual notification includes textual details for the notification. In another example, the content rules for a meeting dress code template may specify that a notification should include text indicating the topic of the meeting and what the user should wear to the meeting. In some implementations, the content rules may specify content to include in the notifications based on specifying content to extract from information. For example, the content rules may specify to extract a meeting title from a meeting appointment and include the meeting title in a notification. In another example, the content rules may specify to extract a subject of an e-mail and include the subject in a notification.

In some implementations, the content rules may specify possible actions that may be included in a notification. For example, the content rules may specify that a notification that another user that the user indicated that the user would like to meet is available, should also include a button that may send a meeting invite request to the other user. In another example, the content rules may specify that a notification that documents are available regarding a next topic to be discussed in a meeting, should also include links to those documents.

The extraction templates may be pre-defined templates that may be shared for users. For example, the templates stored in the extraction template database 140 may be templates that may be applicable to all users. In another example, the templates stored in the extraction template database 140 may be templates that are pre-defined to be applicable to a subset of users.

The custom template database 160 may be a database that stores custom templates. Custom templates may be extraction templates that are customized for a particular user or generated from machine-based learning. For example, the custom template database 160 may include extraction templates defined by a particular user for use by one or more users, and not use by other users. In another example, the custom template database 160 may include extraction templates that are generated by a machine-learning based template generator for one or more users, as further described below in FIG. 2.

The template engine 150 may receive information from one or more of the external sources 110, the enterprise resource database 120, or the user information database 130, receive extraction templates from one or more of the extraction template database 140 or the custom templates 160, and determine when to trigger presenting a notification.

The template engine 150 may determine when to trigger generation of a notification based on the extraction templates and information from one or more of the external sources 110, the enterprise resource database 120, or the user information database 130. For example, the template engine 150 may determine when to trigger generation of a notification indicating that other attendees of a meeting will be late based on meeting information for the user and attendee information for the other users attending the meeting. In a more particular example, the template engine 150 may apply trigger criteria of an extraction template and determine that a meeting including the user starts in less than a pre-determined amount of time specified by the extraction template, in response, determine that location information for other users identified as attending the meeting in-person indicate that the users will likely be late, and in response, determine to trigger presenting a notification when those users are expected to be in attendance.

In another example, the template engine 150 may determine when to trigger generation of a notification indicating a dress code for a meeting based on meeting information indicating an upcoming meeting of a particular meeting type and information indicating dress codes for different meeting types. Other example extraction templates and notifications are described in regards to FIGS. 1B-1D.

In some implementations, the template engine 150 may determine whether trigger criteria is satisfied at a pre-determined time or pre-determined intervals. For example, the template engine 150 may determine whether trigger criteria is satisfied every second, every minute, or every half hour. In another example, the template engine 150 may determine that an extraction template indicates to determine whether trigger criteria is satisfied fifteen minutes before any meeting of a user, and in response to determining that a meeting for a user starts in fifteen meetings, determine whether trigger criteria is satisfied.

In some implementations, the template engine 150 may determine whether trigger criteria is satisfied when a change is detected in the external sources 110, enterprise resources 120, or user information 130. For example, the template engine 150 may determine that a particular source of information has changed, in response, identify extraction templates with which trigger criteria may now be satisfied, and in response, may determine whether trigger criteria is satisfied for those identified extraction templates. In another example, the template engine 150 may determine a threshold amount of data specified by an extraction template has been gathered or analyzed, and in response, may determine whether trigger criteria is satisfied for the extraction template. In some implementations, the template engine 150 may determine the change to detect based on information indicated by the extraction template. For example, the extraction template may define determining whether trigger criteria is satisfied when a particular source of information has changed. In another example, the extraction template may define determining whether trigger criteria is satisfied when a threshold amount of data specified by an extraction template has been gathered or analyzed.

In some implementations, the template engine 150 may determine whether trigger criteria is satisfied in response to an events or inputs from a device of a user. For example, a user's device may provide location information for a user and when a user is in a particular location, the user device may provide a prompt the template engine 150 to determine whether trigger criteria of one or more particular extraction templates associated with the particular location is satisfied. In another example, a device of the user may detect the user has spoken a particular phrase during a meeting, and in response, prompt the template engine 150 to determine whether trigger criteria for one or more extraction templates associated with notifications during meeting or associated with the particular phrase is satisfied. In yet another example, a device of a user may determine that a meeting has ended, and in response, prompt the template engine 150 to determine whether trigger criteria of one or more extraction templates associated with follow-ups to a meeting is satisfied.

The prompt may additionally indicate to the template engine 150 to obtain updated information from one or more of the external sources 110, the enterprise resources database 120, or the user information database 130. For example, a prompt may indicate to the template engine 150 to obtain updated locations for other attendees of a meeting from the enterprise resources database 120. In another example, a prompt may indicate to the template engine 150 to obtain an updated calendar for a user from the user information database 130.

In response to determining to trigger presenting a notification based on an extraction template, the template engine 150 may provide an indication to the notification generator 170 to generate the notification based on the extraction template. For example, in response to determining to trigger presenting a notification that other users will be late to a meeting based on a particular extraction template, the template engine 150 may provide information to the notification generator 170 indicating that the notification generator 170 should generate the notification for the particular extraction template. In another example, in response to determining to trigger generation of a notification indicating a dress code for a meeting based on a particular extraction template, the template engine may provide information to the notification generator 170 indicating that the notification generator 170 should generate the notification for the particular extraction template.

In some implementations, the template engine 150 may provide an indication to generate a notification that also indicates other information for the notification generator. For example, the template engine 150 may provide an indication to the notification generator 170 that also indicates which attendees will likely be late and how late the attendees will likely be. In another example, the template engine 150 may provide an indication to the notification generator 170 that also indicates a dress code for an upcoming meeting.

The template engine 150 may determine the other information to include in the indication based on the extraction template. For example, the extraction template may define that the template engine 150 should provide an indication that indicates which attendees will likely be late, and how late the attendees will likely be. In another example, the extraction template may define that the template engine 150 should provide an indication that indicates the dress code for an upcoming meeting.

The notification generator 170 may receive an indication to generate a notification to present to a user and, in response, generate the notification. For example, the notification generator 170 may receive an indication to generate a notification indicating that other users attending a meeting will be late, and in response, generate the notification, "EVERYONE ELSE IS APPROXIMATELY 10 MINUTES LATE FOR THE MEETING." In another example, the notification generator 170 may receive an indication to generate a notification indicating a dress code for a meeting, and in response, generate the notification, "YOU SHOULD WEAR A SUIT AND TIE FOR YOUR UPCOMING MEETING."

The notification generator 170 may generate the notification based on content rules of an extraction template. For example, the notification generator 170 may obtain content rules that indicate that the notification generator 170 should generate a notification that indicates the estimated time of attendance for all users that are expected to be late to a meeting. In another example, the notification generator 170 may receive an indication that the notification is for the meeting dress code template, and in response, obtain the content rules for the meeting dress code template extraction template from the extraction template database 140.

As described above, the notification generator 170 may receive additional information to include in the notification in the indication from the template engine 150. For example, the notification generator 170 may receive information indicating which attendees will likely be late and how late the attendees will likely be, and then include that information in the notification based on the content rules. Additionally or alternatively, the notification generator 170 may generate the information to include in the notification. For example, the notification generator 170 may determine which attendees will likely be late and how late the attendees will likely be based on information from one or more of the external sources 110, the enterprise resource database 120, or the user information database 130, and include the information in the notification.

The access control engine 172 may determine whether a user that would receive the notification is permitted to receive the contents of the notification. For example, the access control engine 172 may determine whether a user that would receive a notification indicating when other users attending a meeting are expected to be in attendance has permissions to receive information regarding the other user's attendance. In another example, the access control engine 172 may determine whether a user that would receive a notification indicating a dress code for a meeting has permissions to receive information indicating a dress code for a meeting.

The access control engine 172 may determine whether a user that would receive a notification is permitted to receive the contents of the notification based on access control information associated with content, where the access control information indicates what users or groups of users may receive the content. For example, the access control engine 172 may determine if a user that would receive a notification including the attendance information of other attendees, is identified by access control information for the attendance information of other attendees as permitted to receive the attendance information of other attendees. In another example, the access control engine 172 may determine if a user that would receive a notification including a dress code for a meeting, is identified by access control information for the dress code information as permitted to receive the dress code information.

If the access control engine 172 determines that the user that would receive the notification does not have permission to receive the contents of the notification, the access control engine 172 may prevent the content from being presented to the user. For example, the access control engine 172 may block the notification from being presented to the user. In another example, the access control engine 172 may block the notification generator 170 from receiving an indication to generate a notification from the template engine 150.

In some implementations, the access control engine 172 may modify a notification based on a definition in an extraction template for the notification. For example, the extraction template may define that if the access control engine 172 determines that a user is not permitted to receive information indicating when particular users are expected to be in attendance at a meeting, the access control engine 172 should provide the user a notification indicating that one or more users will likely be late without identifying the one or more users. In another example, the extraction template may define that if the access control engine 172 determines that a user is not permitted to access a particular document that would be included in a notification including other documents, the access control engine 172 should provide the user a notification including the other documents without the particular document.

In some implementations, the access control engine 172 may manage providing notifications based on actions permitted by the user. For example, the access control engine 172 may determine that a user is permitted to share a notification that includes particular content, and in response to determining that the user is permitted to share a notification that includes particular content, provide a notification that may be shared. In another example, the access control engine 172 may determine that a user is not permitted to share a notification that includes particular content, and in response to determining that the user is not permitted to share a notification that includes particular content, provide a notification that can not be shared by the user.

Different configurations of the system 100 may be used where functionality of the external sources 110, the enterprise resource database 120, the user information database 130, the extraction template database 140, the template engine 150, the custom template database 160, the notification generator 170, and the access control engine 172 may be combined, further separated, distributed, or interchanged. The system 100 may be implemented in a single device or distributed across multiple devices.

Figure 1B:
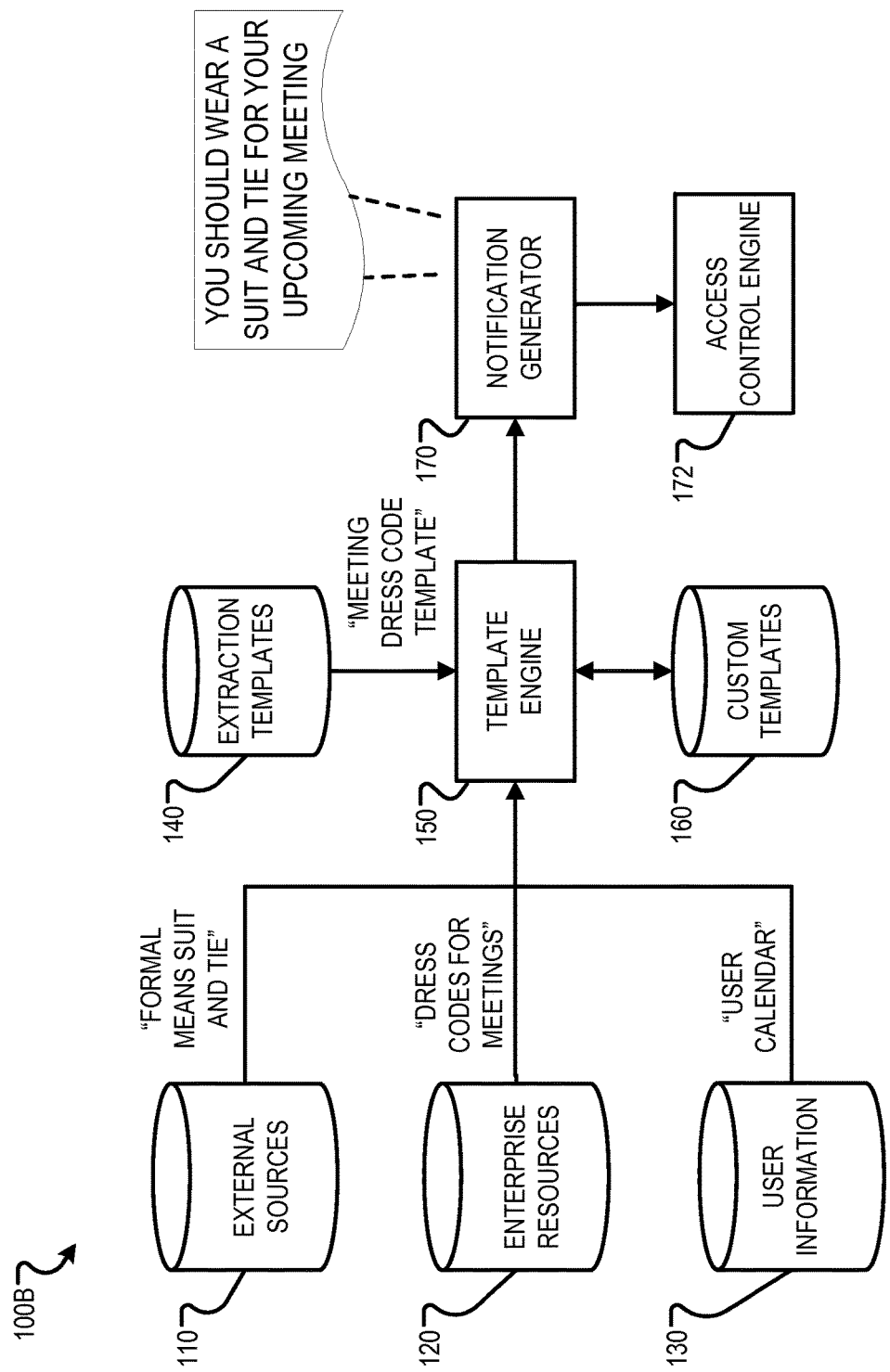

FIG. 1B is a block diagram of an example system 100B for presenting a notification before a meeting, based on external sources, enterprise resources, and user information, in an enterprise system. For example, the system 100B may present a notification, "YOU SHOULD WEAR A SUIT AND TIE FOR YOUR UPCOMING MEETING," before a meeting. Briefly, and as described in further detail below, the system 100B may include the external sources 110, the enterprise resource database 120, the user information database 130, the extraction template database 140, the template engine 150, the custom template database 160, the notification generator 170, and the access control engine 172 shown in FIG. 1 for system 100.

In the system 100B, the template engine 150 may receive information from the external sources 110, the enterprise resource database 120, and the user information database 130. For example, the template engine may receive information from the external sources 110 that indicates that a formal dress code means wearing a suit and tie, information from the enterprise resource database 120 that indicates dress codes for various types of meetings, and information from the user information database 130 indicating a user calendar that includes an upcoming meeting of a particular type.

The template engine 150 may receive a meeting dress code template from the extraction template database 140. For example, the template engine 150 may receive a meeting dress code template that defines trigger criteria for presenting a notification to a user that an upcoming meeting has a particular dress code when the dress code for the meeting involves wearing suit, and defines content rules that indicate that the notification should indicate the particular dress code for the meeting.

The template engine 150 may determine that the trigger criteria defined by the extraction template is satisfied. For example, the template engine 150 may determine that the user's morning alarm on a device has just been turned off and the user has an upcoming meeting of a type "customer meeting." In response, the template engine 150 may determine the dress code type of the meeting type. For example, the template engine 150 may determine that the dress code type for a meeting type of "customer meeting" is formal. In response, the template engine 150 may determine that the dress code type of the meeting type involves wearing a suit. For example, the template engine 150 may determine from the information from the external sources 110 that that formal means suit and tie so the meeting involves wearing suit. In response, the template engine 150 may determine to trigger presenting a notification. For example, the template engine 150 may determine that the trigger criteria for the meeting dress code template is satisfied.

In response to determining that trigger criteria of an extraction template is satisfied, the template engine 150 may provide an indication to the notification generator 170 to generate a notification. For example, the template engine 150 may provide an indication to the notification generator to generate a notification for the meeting dress code template.

The notification generator 170 may receive the notification to generate the notification and determine the content rules for generating the notification. For example, the notification generator 170 may receive the content rules from the template engine 150. In another example, the notification generator 170 may receive an indication that the notification is for the meeting dress code template, and in response, obtain the content rules for the meeting dress code template extraction template from the extraction template database 140.

The notification generator 170 may then generate the notification based on the content rules. For example, the content rules may define to indicate in the notification what the user should wear to the meeting, e.g., a suit and tie, and the notification generator 170 may generate a notification that indicates that the user should wear a suit and tie.

The notification generator 170 may generate the content for the notification based on other information received from the template engine 150. For example, the template engine 150 may determine to provide information indicating that the user should wear a suit and tie based on the meeting dress code template indicating that the template engine 150 should provide that information to the notification generator 170.

Additionally or alternatively, the notification generator 170 may generate the content for the notification based on information from one or more of the external sources 110 that indicates that a formal dress code means wearing a suit and tie, information from the enterprise resource database 120 that indicates the dress codes for various types of meetings, and information from the user information database 130.

Figure 1C:
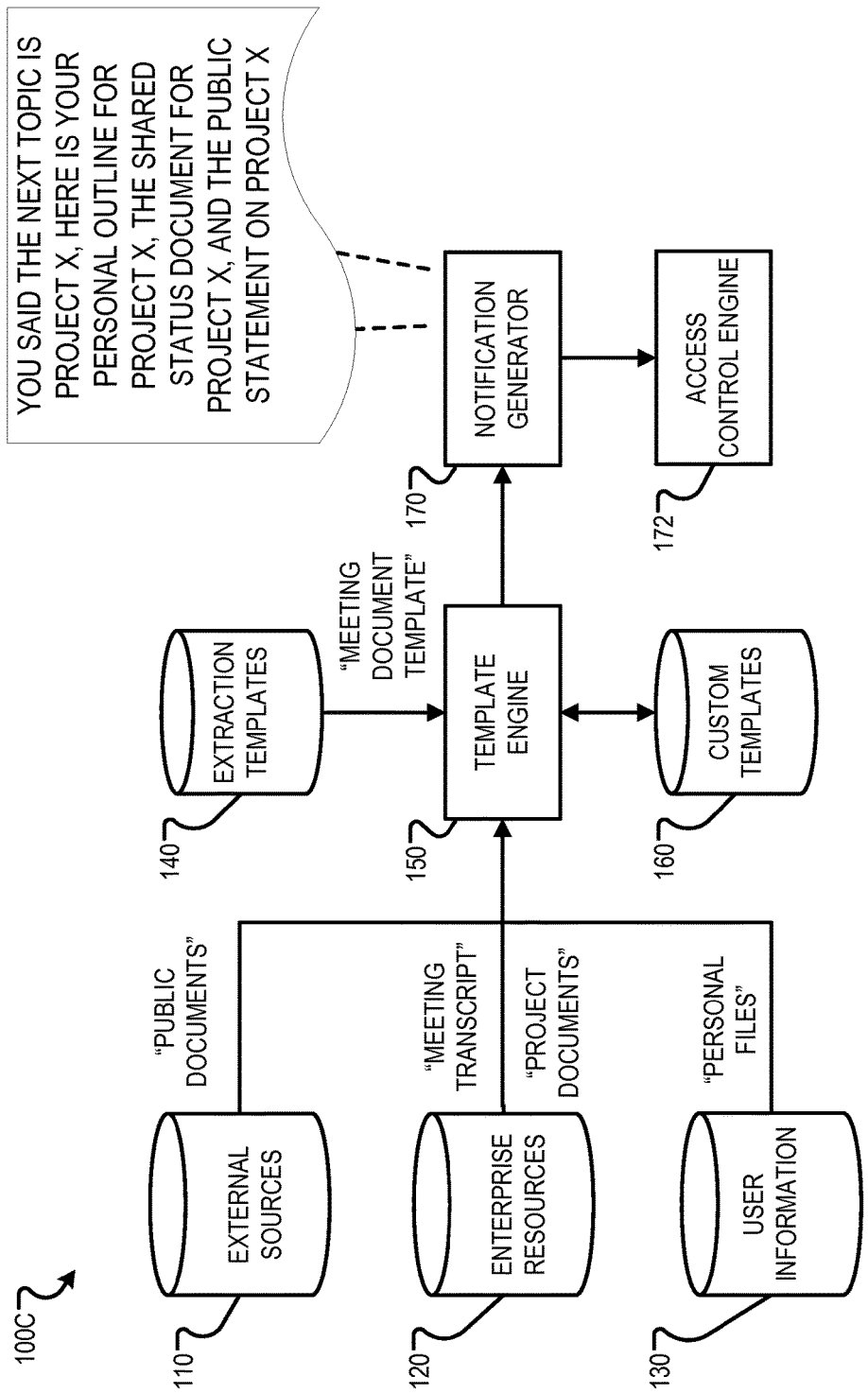

FIG. 1C is a block diagram of an example system 100C for presenting a notification during a meeting, based on external sources, enterprise resources, and user information, in an enterprise system. For example, the system 100C may present a notification, "YOU SAID THE NEXT TOPIC IS PROJECT X, HERE IS YOUR PERSONAL OUTLINE FOR PROJECT X, THE SHARED STATUS DOCUMENT FOR PROJECT X, AND THE PUBLIC STATEMENT ON PROJECT X," during a meeting. Briefly, and as described in further detail below, the system 100C may include the external sources 110, the enterprise resource database 120, the user information database 130, the extraction template database 140, the template engine 150, the custom template database 160, the notification generator 170, and the access control engine 172 shown in FIG. 1 for system 100.

In the system 100C, the template engine 150 may receive information from the external sources 110, the enterprise resource database 120, and the user information database 130. For example, the template engine 150 may receive information from the external sources 110 indicating a public statement on project X, information from the enterprise resource database 120 indicating a shared status document for project X and a meeting transcript, and information from the user information database 130 indicating a personal outline for project X.

The template engine may also receive a meeting document template from the extraction template database 140. The meeting document template may define trigger criteria to present a notification to a user during a meeting that particular documents relevant to a subject are available when the user appears to begin speaking about the subject, and define content rules that indicate that the notification should indicate the particular documents.

The template engine 150 may determine that trigger criteria for an extraction template is satisfied. For example, the template engine 150 may apply a meeting document template that defines trigger criteria of a meeting transcript including the phrase "THE NEXT TOPIC IS," to a meeting transcript for an ongoing meeting. In response, the template engine 150 may determine to determine whether documents that may be relevant to the next topic are available to the template engine 150. For example, the template engine 150 may determine whether documents associated with project X are available to the template engine 150. In response, the template engine 150 may identify one or more documents from one or more of the external sources 110, the enterprise resource database 120, and the user information database 130, as relevant to the next topic. For example, the template engine 150 may determine that the public statement on project X, the shared status document for project X, and the personal outline for project X are associated with project X. In response, the template engine 150 may determine that the trigger criteria is satisfied and provide an indication to the notification generator 170 to generate a notification. For example, the template engine 150 may determine that the trigger criteria for the meeting document template is satisfied, and in response provide an indication to the notification generator 170 to generate a notification for the meeting document template.

The notification generator 170 may then generate the notification based on the content rules. For example, the notification generator 170 may then generate the notification, "YOU SAID THE NEXT TOPIC IS PROJECT X, HERE IS YOUR PERSONAL OUTLINE FOR PROJECT X, THE SHARED STATUS DOCUMENT FOR PROJECT X, AND THE PUBLIC STATEMENT ON PROJECT X," based on the content rules for the meeting document template.

Figure 1D:
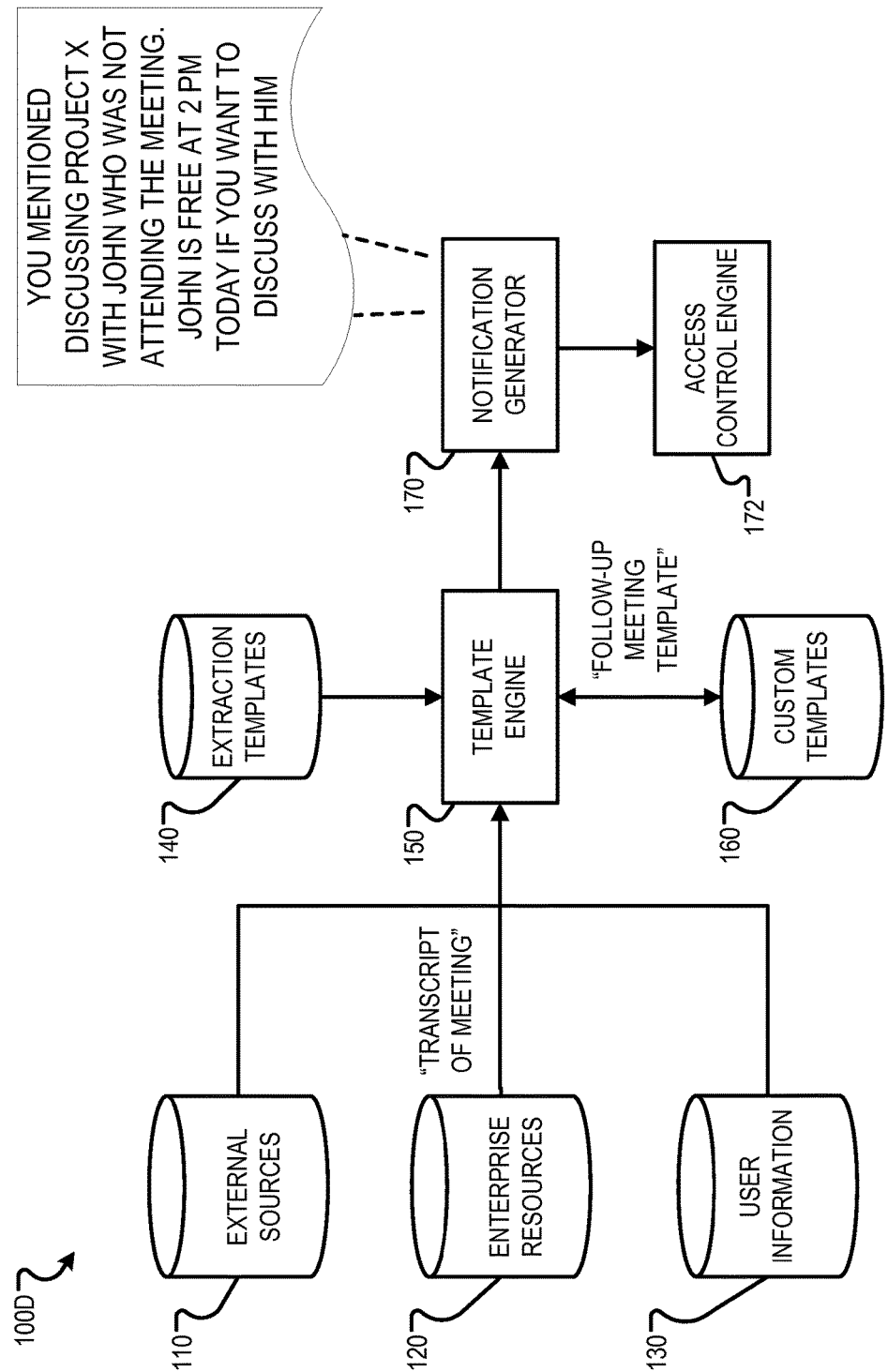

FIG. 1D is a block diagram of an example system 100D for presenting a notification after a meeting in an enterprise system. For example, the system 100D may present a notification, "YOU MENTIONED DISCUSSING PROJECT X WITH JOHN WHO WAS NOT ATTENDING THE MEETING. JOHN IS FREE AT 2 PM TODAY IF YOU WANT TO DISCUSS WITH HIM," after a meeting based on enterprise resources indicating a transcript of a meeting. Briefly, and as described in further detail below, the system 100D may include the external sources 110, the enterprise resource database 120, the user information database 130, the extraction template database 140, the template engine 150, the custom template database 160, the notification generator 170, and the access control engine 172 shown in FIG. 1 for system 100.

In the system 100D, the template engine 150 may receive information from the enterprise resource database 120 indicating a transcript or substantively real-time audio data of a meeting. The template engine may also receive a follow-up meeting template from the custom template database 160. The follow-up meeting template may define trigger criteria to present a notification to a user about follow-ups to a meeting, and define content rules that indicate what information for follow-ups the notification should indicate.

The template engine 150 may determine that the trigger criteria defined by the follow-up meeting template is satisfied. For example, the template engine 150 may apply the follow-up meeting template to the transcript of the meeting and determine that the user has said that the user will talk to a particular person after the meeting. In a particular example, the template engine 150 may determine that "I WILL TALK TO JOHN DOE ABOUT THIS AFTER THIS MEETING" in a meeting transcript includes an identification of a particular person, "JOHN DOE," and an indication that the user will talk to that person after the meeting, "I WILL TALK TO [PERSON] . . . AFTER THIS MEETING."

In response, the template engine 150 may provide an indication to the notification generator 170 to generate a notification. For example, the template engine 150 may provide an indication to the notification generator 170 to generate a notification for the follow-up meeting template. As described above, in some implementations, the indication may identify John Doe is the other user to attend the meeting.

The notification generator 170 may then generate the notification based on the content rules for the follow-up meeting template. For example, the notification generator 170 may then generate the notification, "YOU MENTIONED DISCUSSING PROJECT X WITH JOHN WHO WAS NOT ATTENDING THE MEETING. JOHN IS FREE AT 2 PM TODAY IF YOU WANT TO DISCUSS WITH HIM," based on the content rules for the follow-up meeting template. In the example, the notification generator 170 may generate the notification based on determining that the user wanted to meet with John Doe, and in response, determine that 2 PM is the first available time period that the user and John Doe are both available.

Figure 2:
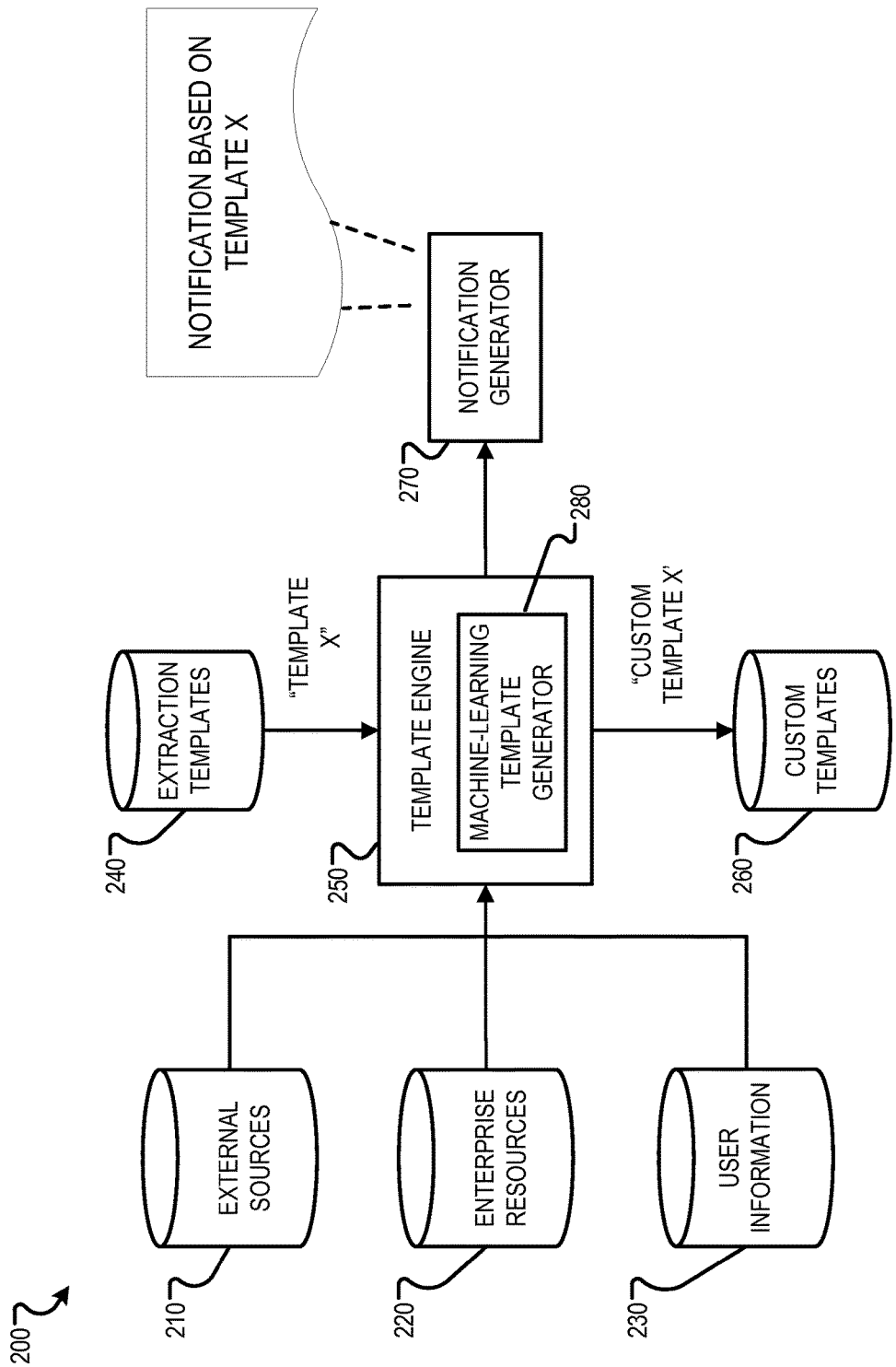
FIG. 2 is a block diagram of an example system for presenting notifications based on machine-learning generated templates.

FIG. 2 is a block diagram of an example system 200 for presenting notifications based on machine-learning generated templates. Briefly, and as described in further detail below, the system 200 may include external sources 210, an enterprise resource database 220, a user information database 230, an extraction template database 240, a template engine 250 including a machine-learning template generator 280, a custom template database 260, a notification generator 270, and an access control engine 272.

The machine-learning template generator 280 may be a generator that recognizes patterns over time and generates or modifies extraction templates based on the patterns and user behavior. For example, the machine-learning generator 280 may recognize a pattern that particular users do not use particular notifications of particular extraction templates in particular situations, and in response, generate custom templates based on those extraction templates so that those particular notifications are not provided in those particular situations. The machine-learning generator 280 may store those custom templates in the custom template database 260. For example, the machine-learning generator 280 may determine that users ignore notifications generated from extraction template X in situation Y, and in response, the machine-learning template generator 280 may generate custom template X based on template X so that the notification is not generated in that situation. The system 200 may then use custom template X stored in the custom template database 260 as a replacement for a corresponding extraction template X stored in the extraction template database 240.

In another example, the machine-learning generator 280 may recognize a pattern that particular users perform particular actions before particular types of meetings, and in response, suggest to those particular users that the machine-learning generator 280 generate a custom template for the users so that the users may be notified that the users may want to perform the particular actions before particular types of meetings.

Figure 3:
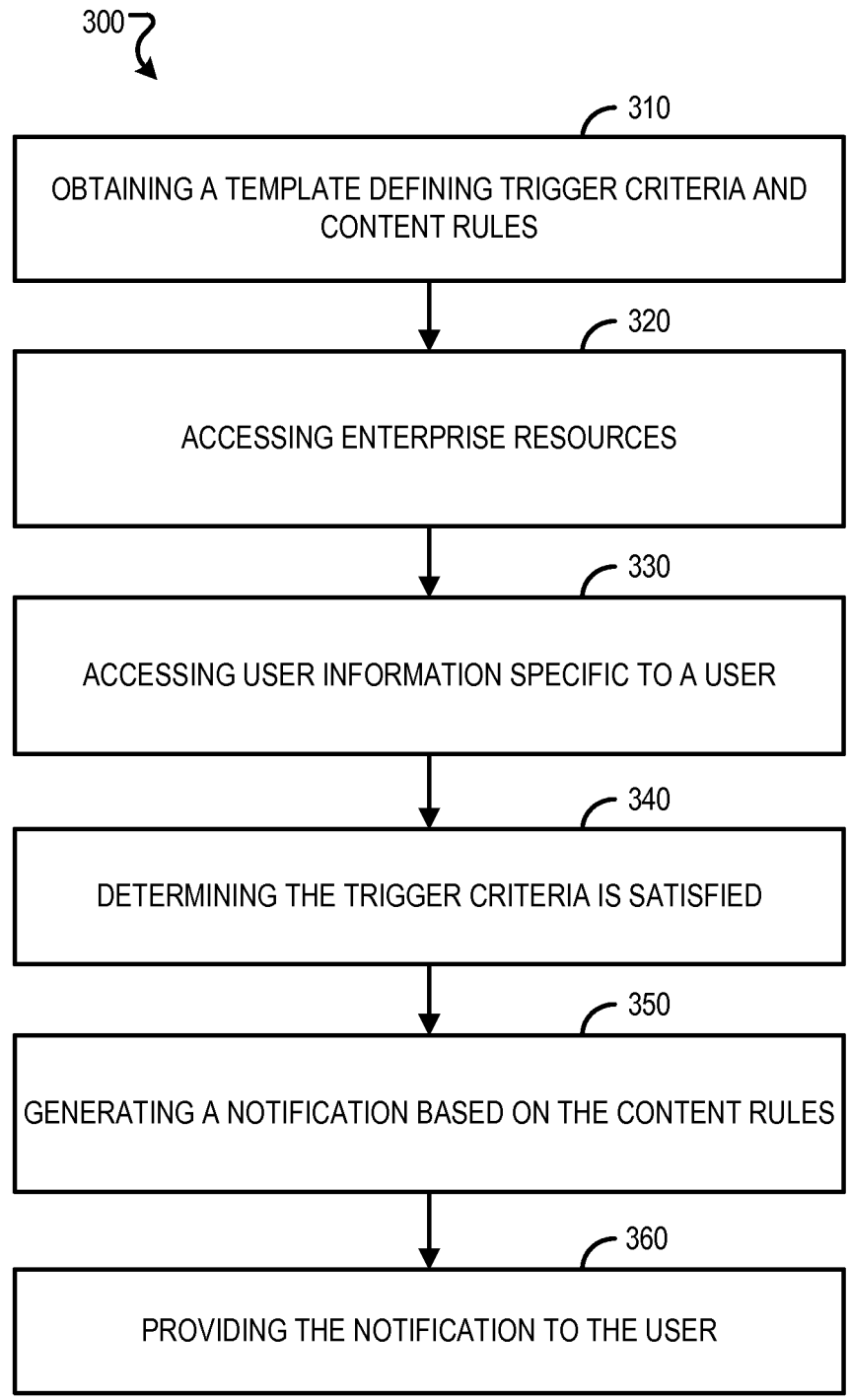
FIG. 3 is a flowchart of an example process for presenting notifications in enterprise system.

FIG. 3 is a flowchart of an example process 300 for presenting notifications in enterprise system. The following describes the process 300 as being performed by components of the system 100 that is described with reference to FIG. 1. However, the process 300 may be performed by other systems or system configurations.

The process 300 may include obtaining a template defining trigger criteria and content rules (310). For example, the template engine may obtain a meeting document template from the extraction template database 140 or from the custom template database 160. The meeting document template may define trigger criteria to present a notification to a user during a meeting that particular documents relevant to a subject are available when the user appears to begin speaking about the subject, and define content rules that indicate that the notification should indicate the particular documents.

The process may include accessing enterprise resources (320). For example, the template engine 150 may receive information that includes a meeting transcript and project documents from the enterprise resources database 120.

The process may include accessing user information specific to a user (330). For example, the template engine 150 may obtain user information that indicates personal files from the user information database 130.

The process may include determining the trigger criteria is satisfied (340). For example, the template engine 150 may determine that trigger criteria to present a notification to a user during a meeting that particular documents relevant to a subject are available when the user appears to begin speaking about the subject, is satisfied based on determining that a meeting transcript includes the phrase "THE NEXT TOPIC IS."

The process may include generating a notification based on the content rules (350). For example, the notification generator 170 may generate the notification, "YOU SAID THE NEXT TOPIC IS PROJECT X, HERE IS YOUR PERSONAL OUTLINE FOR PROJECT X, THE SHARED STATUS DOCUMENT FOR PROJECT X, AND THE PUBLIC STATEMENT ON PROJECT X," based on the content rules for the meeting document template that indicate that the notification should indicate why the notification is being presented and the particular documents that may be relevant to the next topic.

The process may include providing the notification to the user (360). For example, the access control engine 172 may determine that the user is permitted to receive the content in the notification, and in response, provide the notification to a client device, e.g., a mobile computing device or a non-mobile computing device, used by the user.

Figure 4:
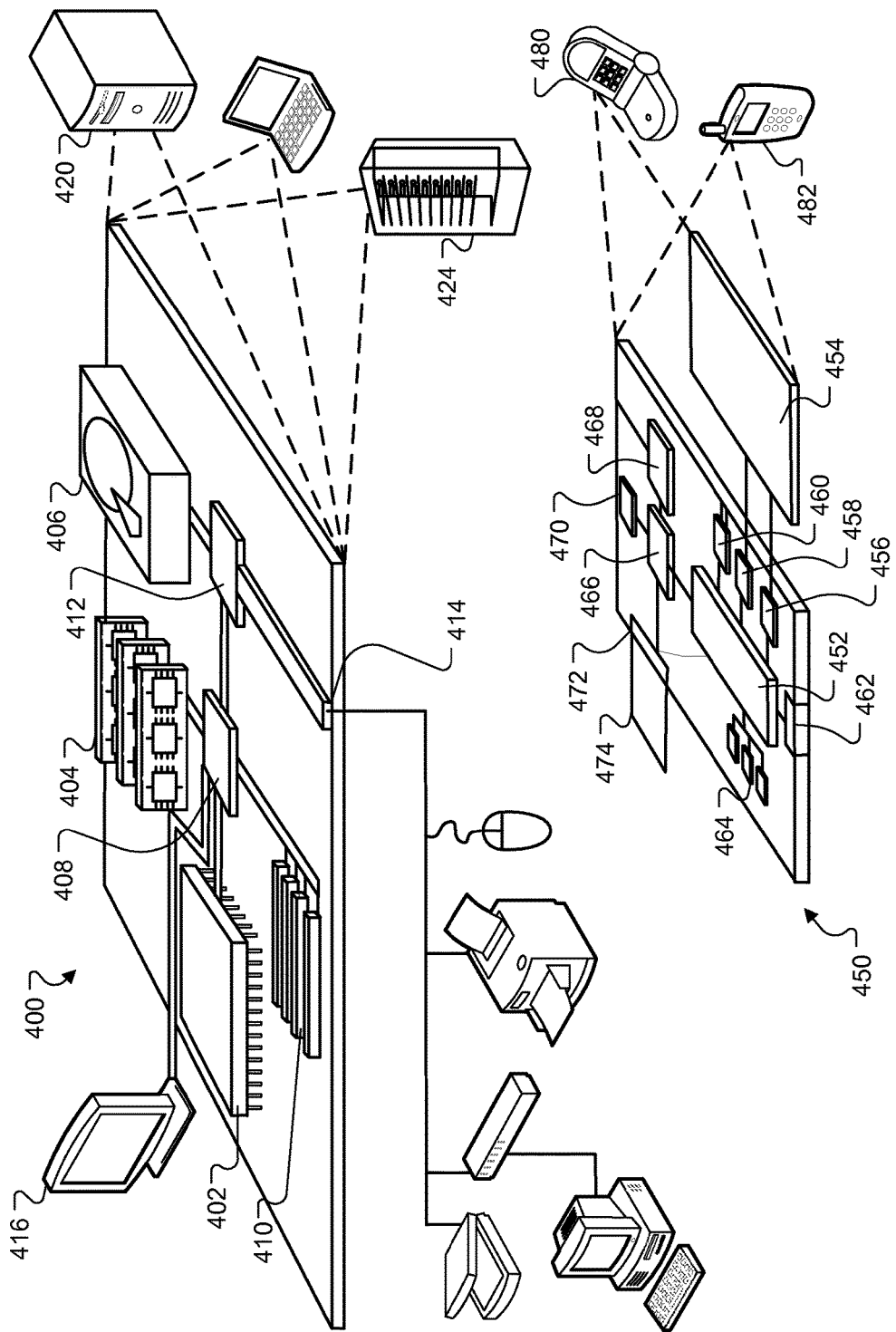
FIG. 4 is a diagram of exemplary computing devices.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile computing devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile computing device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile computing device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A method implemented in a data processing apparatus, comprising:

obtaining, by a template engine of a notification system that includes the template engine, a notification generator, and a template database that stores multiple templates that each define (i) respective trigger criteria for presenting a respective notification and (ii) respective content rules for determining respective content to include in the respective notification, a template that defines (i) trigger criteria for presenting a notification and (ii) content rules for determining content to include in the notification, from the template database;

accessing, by the template engine, enterprise resources of an enterprise, the enterprise resources including data describing entities related to the enterprise and relationships among the entities and a transcription of an ongoing meeting;

accessing, by the template engine, user information specific to a user, the user information including information not described by the enterprise resources that are accessible to the user;

determining, by the template engine, that the trigger criteria defined by the template is satisfied by the enterprise resources and the user information based at least on a determination that the enterprise resources describe that the user is currently in the ongoing meeting and the user information includes a personal document that is relevant to a next topic of the ongoing meeting according to the transcription of the ongoing meeting;

in response to determining that the trigger criteria defined by the template obtained from the template database is satisfied by the enterprise resources and the user information based at least on the determination that the enterprise resources describe that the user is currently in the ongoing meeting and the user information includes the personal document that is relevant to the next topic of the ongoing meeting according to the transcription of the ongoing meeting, generating, by the notification generator, a particular notification that identifies the personal document that is relevant to the next topic of the ongoing meeting based at least on the content rules defined by the template obtained from the template database; and in response to generating the particular notification, providing the particular notification to a computing device of the user for display to the user.

2. The method of claim 1, wherein the trigger criteria comprises:

detecting a change in data describing an entity that is indicated by the relationships among the entities as being related to the user.

3. The method of claim 1, wherein the trigger criteria comprises:

detecting a particular spoken phrase.

4. The method of claim 1, wherein the content rules comprise rules that include:

extracting text from the enterprise resources; and
including the text in the particular notification.

5. The method of claim 1, comprising:

generating the template using a machine-learning based template generator.

6. The method of claim 1, comprising:

sharing the template with multiple users.

7. The method of claim 1, wherein generating the particular notification based at least on the content rules, comprises:

removing content from the particular notification that the user is not permitted to access.

8. The method of claim 1, wherein determining, by the template engine, that the trigger criteria defined by the template is satisfied by the enterprise resources and the user information based at least on a determination that the enterprise resources describe that the user is currently in the ongoing meeting and the user information includes a personal document that is relevant to a next topic of the ongoing meeting according to the transcription of the ongoing meeting comprises:

determining the next topic of the ongoing meeting from text in the transcription; and determining that the user information includes the personal document that is relevant to the next topic that is determined from the text in the transcription, wherein generating the particular notification is in response to determining that the user information includes the personal document that is relevant to the next topic.

9. A system comprising:

one or more computers; and one or more storage devices storing instructions that are operable, when executed by the one or more computers, to cause the one or more computers to perform operations comprising:

obtaining, by a template engine of a notification system that includes the template engine, a notification generator, and a template database that stores multiple templates that each define (i) respective trigger criteria for presenting a respective notification and (ii) respective content rules for determining respective content to include in the respective notification, a template that defines (i) trigger criteria for presenting a notification and (ii) content rules for determining content to include in the notification, from the template database;

accessing, by the template engine, enterprise resources of an enterprise, the enterprise resources including data describing entities related to the enterprise and relationships among the entities and a transcription of an ongoing meeting;

accessing, by the template engine, user information specific to a user, the user information including information not described by the enterprise resources that are accessible to the user;

determining, by the template engine, that the trigger criteria defined by the template is satisfied by the enterprise resources and the user information based at least on a determination that the enterprise resources describe that the user is currently in the ongoing meeting and the user information includes a personal document that is relevant to a next topic of the ongoing meeting according to the transcription of the ongoing meeting;

in response to determining that the trigger criteria defined by the template obtained from the template database is satisfied by the enterprise resources and the user information based at least on the determination that the enterprise resources describe that the user is currently in the ongoing meeting and the user information includes the personal document that is relevant to the next topic of the ongoing meeting according to the transcription of the ongoing meeting, generating, by the notification generator, a particular notification that identifies the personal document that is relevant to the next topic of the ongoing meeting based at least on the content rules defined by the template obtained from the template database; and providing the particular notification to a computing device of the user for display to the user.

10. The system of claim 9, wherein the trigger criteria comprises:

detecting a change in data describing an entity that is indicated by the relationships among the entities as being related to the user.

11. The system of claim 9, wherein the trigger criteria comprises:

detecting a particular spoken phrase.

12. The system of claim 9, wherein the content rules comprise rules that include:

extracting text from the enterprise resources; and
including the text in the particular notification.

13. The system of claim 9, the operations comprising:

generating the template using a machine-learning based template generator.

14. The system of claim 9, the operations comprising:

sharing the template with multiple users.

15. The system of claim 9, wherein generating the particular notification based at least on the content rules, comprises:

removing content from the particular notification that the user is not permitted to access.

16. A non-transitory computer-readable medium storing instructions executable by one or more computers which, upon such execution, cause the one or more computers to perform operations comprising:

obtaining, by a template engine of a notification system that includes the template engine, a notification generator, and a template database that stores multiple templates that each define (i) respective trigger criteria for presenting a respective notification and (ii) respective content rules for determining respective content to include in the respective notification, a template that defines (i) trigger criteria for presenting a notification and (ii) content rules for determining content to include in the notification, from the template database;

accessing, by the template engine, enterprise resources of an enterprise, the enterprise resources including data describing entities related to the enterprise and relationships among the entities and a transcription of an ongoing meeting;

accessing, by the template engine, user information specific to a user, the user information including information not described by the enterprise resources that are accessible to the user;

determining, by the template engine, that the trigger criteria defined by the template is satisfied by the enterprise resources and the user information based at least on a determination that the enterprise resources describe that the user is currently in the ongoing meeting and the user information includes a personal document that is relevant to a next topic of the ongoing meeting according to the transcription of the ongoing meeting;

in response to determining that the trigger criteria defined by the template obtained from the template database is satisfied by the enterprise resources and the user information based at least on the determination that the enterprise resources describe that the user is currently in the ongoing meeting and the user information includes the personal document that is relevant to the next topic of the ongoing meeting according to the transcription of the ongoing meeting, generating, by the notification generator, a particular notification that identifies the personal document that is relevant to the next topic of the ongoing meeting based at least on the content rules defined by the template obtained from the template database; and providing the particular notification to a computing device of the user for display to the user.

17. The medium of claim 16, wherein the trigger criteria comprises:
detecting a change in data describing an entity that is indicated by the relationships among the entities as being related to the user.

18. The medium of claim 16, wherein the trigger criteria comprises:
detecting a particular spoken phrase.

19. The medium of claim 16, wherein the content rules comprise rules that include:
extracting text from the enterprise resources; and
including the text in the particular notification.

20. The medium of claim 16, the operations comprising:
generating the template using a machine-learning based template generator.

* * * * *

UNITED STATES PATENT AND TRADEMARK OFFICE
CERTIFICATE OF CORRECTION

PATENT NO. : 10,158,734 B2
APPLICATION NO. : 14/798913
DATED : December 18, 2018
INVENTOR(S) : Brune et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 201 days.

Signed and Sealed this
Twenty-fifth Day of June, 2019

Andrei Iancu
*Director of the United States Patent and Trademark Office*